United States Patent [19]

Farmer

[11] Patent Number: 5,272,646
[45] Date of Patent: Dec. 21, 1993

[54] METHOD FOR LOCATING LEAKS IN A FLUID PIPELINE AND APPARATUS THEREFORE

[76] Inventor: Edward J. Farmer, 1611 20th St., Sacramento, Calif. 95814

[21] Appl. No.: 684,168

[22] Filed: Apr. 11, 1991

[51] Int. Cl.⁵ .................. G01F 15/00; G06F 15/20
[52] U.S. Cl. .................. 364/509; 73/40.5 R; 340/605
[58] Field of Search ............ 364/509, 510; 73/40.5 R, 40.5 A, 40, 49.1; 340/605

[56] References Cited

U.S. PATENT DOCUMENTS

| | | | |
|---|---|---|---|
| 3,711,689 | 1/1973 | Park | 364/510 |
| 3,952,759 | 4/1976 | Ottenstein | 364/510 |
| 4,012,944 | 3/1977 | Covington et al. | 73/40.5 R |
| 4,083,229 | 4/1978 | Anway | 73/40.5 A |
| 4,091,658 | 5/1978 | Convington et al. | 73/40.5 R |
| 4,144,743 | 3/1979 | Covington et al. | 73/40.5 R |
| 4,289,019 | 9/1981 | Claytor | 364/510 X |
| 4,306,446 | 12/1981 | Fukuda | 364/510 X |
| 4,308,746 | 1/1982 | Covington | 73/40.5 R |
| 4,402,213 | 9/1983 | Hogan | 73/40.5 R |
| 4,796,466 | 1/1989 | Farmer | 73/40.5 R |
| 4,942,758 | 7/1990 | Cofield | 364/510 |
| 4,958,296 | 9/1990 | Saitoh et al. | 364/509 |

Primary Examiner—Kevin J. Teska
Attorney, Agent, or Firm—Bernhard Kreten

[57] ABSTRACT

A method and apparatus for determining the location of a leak in a fluid containing pipeline. Plural monitoring stations sample fluid flow criteria which change in the presence of a leak. The change in the criteria as a function of a variable such as time will allow extrapolation to discern the location. At each location either pressure or flow rate or both are measured. The measurements occur at regular intervals and a record of fluid flow criteria is created for each monitoring station. The record of each monitoring station is continually transmitted to a central location where a data processor analyzes the records and establishes the leak's location. One of three algorithms, or any combination thereof, is used by the data processor to calculate the leak's location. Each algorithm is tuned to the specific pipeline to compensate for unique characteristics thereof. An output device communicates the location of the leak to an operator or automatically takes appropriate action in response to the leak.

37 Claims, 7 Drawing Sheets

ONE-END P-V PHASE
LEAK DETECTION

METHOD FOR LOCATING LEAKS IN A FLUID PIPELINE AND APPARATUS THEREFORE

FIELD OF THE INVENTION

The present invention relates to the systems, methods, and means whereby the location of a leak on a pipeline may be determined. The method includes the monitoring devices used and equations used in calculating the leak's location.

BACKGROUND OF THE INVENTION

Determining the location of a leak in a pipeline is important because it allows the operator of the monitored pipeline to take prompt and appropriate corrective action such as closing the proper pipeline isolation valves and dispatching of spill mitigation and pipeline repair crews to the proper locations.

Various methods have been used to find the location of leaks on pipelines. These methods may be classified as environmental monitoring methods and pipeline measurement-based methods.

Environmental monitoring methods use sensors external to the pipeline to detect the presence of the fluid contained within the pipeline. The existence of a leak is inferred from the presence of the fluid outside of the pipeline. The location is inferred to be near the sensor that detected the presence of the fluid.

Environmental monitoring methods have proven ineffective in detecting the leakage of some commonly used fluids since sensors are not available to differentiate the fluids of interest from those normally occurring in nature.

In addition to the problems in detecting the leakage of some fluids, it is often difficult to determine the location. For precision in determining the location, a large number of generally costly sensors are required. Various transient atmospheric and hydraulic conditions can influence the path a leaking fluid may take from the location of the leak to a sensor. Consequently, the assumption that the leak is closest to the sensor that detected it is not always valid.

Pipeline measurement-based methods can be categorized into two classes. The first class may be referred to as wave propagation time methods and the second may be referred to as energy grade line methods.

Wave propagation time methods detect the passage of the pressure expansion wave associated with a leak at two locations, one upstream of the leak and the other downstream. The location is determined by noting the exact time the expansion wave is detected by each of the two sensors and calculating the point of origin by considering, in addition to the detection times, the speed with which an expansion wave can propagate in the fluid of interest.

Wave propagation time methods have not worked well in actual applications because of several pratical limitations of the technique. The most significant problem is in detection of the expansion wave front itself. Special pressure transducers with a wide frequency response have been necessary to detect the wavefront and they are expensive and fragile. Often the changes in pressure that constitute the wavefront can be obscured by other changes in pressure that normally occur on the pipeline, thus rendering the pressure changes undetectable. As the expansion wave travels down a long pipeline its rise time decreases. This can cause a sensor close to the leak to detect its occurrence at an earlier time relative to the leading edge of the wavefront than does a sensor further away. This effect results in significant errors in the computed location of the leak.

Methods based on energy grade line calculations are based on the assumption that the energy grade line along a pipeline is of constant slope between ends when there is no leak.

When a leak occurs, a discontinuity in the slope of the energy grade line occurs at the location of the leak. This location may be found by projecting a new energy grade line based on inlet conditions from the inlet end of the line toward the leak and projecting a similar line based on outlet conditions from the outlet end of the line toward the leak. The point at which the lines intersect is the location of the leak.

Difficulties with this method have occurred in practice for at least two reasons. First, it is difficult to measure the pressure and flow accurately enough to get a precise location. Especially for small leaks, the two lines intersect at very shallow angles and consequently the computed location is very sensitive to small measurement errors. Second, the fundamental assumption that the leak is located at the point of discontinuity of slope of the energy grade line is true only when the line is flowing at a steady state. If the pipeline were initially at a steady state and a leak occurred, the pipeline would transition (typically over a period of minutes) to a new hydraulic load imposed by the leak. During this period of transition the assumptions on which the technique are based are not true since the line is not at a steady state. As a result the location process is very slow. It can take several minutes to an hour or more for the location process to be completed.

The following patents reflect the state of the art of which applicant is aware and are included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
|---|---|---|
| Kreiss | 3,664,357 | May 23, 1972 |
| Matthews, Jr. et al. | 3,903,730 | September 9, 1975 |
| Covington et al. | 4,012,944 | March 22, 1977 |
| Hirano | 4,090,179 | May 16, 1978 |
| Covington et al. | 4,091,658 | May 30, 1978 |
| Elliott et al. | 4,106,099 | August 8, 1978 |
| Covington et al. | 4,144,743 | March 20, 1979 |
| Covington | 4,308,746 | January 5, 1982 |
| Anway | B 1 4,083,229 | February 1, 1983 |
| Hogan | 4,375,763 | March 8, 1983 |
| Anway | 4,083,229 | April 11, 1978 |
| Burgess et al. | 4,384,475 | May 24, 1983 |
| Hogan | 4,402,213 | September 6, 1983 |
| Claude | 4,450,711 | May 29, 1984 |
| Werner | 4,507,128 | March 26, 1985 |
| Anthony et al. | 4,574,618 | March 11, 1986 |
| Cota et al. | 4,586,142 | April 29, 1986 |
| Barkhoudarian | 4,612,797 | September 23, 1986 |
| Schwarz et al. | 4,621,520 | November 11, 1986 |
| Holm et al. | 4,625,545 | December 2, 1986 |
| Sugimoto et al. | 4,650,636 | March 17, 1987 |
| Farmer | 4,796,466 | January 10, 1989 |

The patents to Covington are interesting in that they reveal a method and apparatus for leak detection based on monitoring the characteristics of the fluid within a pipeline. The Covington patents are distinguishable from the instant invention, however, in that the instant invention provides both leak detection and leak location. The Covington patents provide only leak detection.

The patent to Burgess et al. describes a device capable of detecting and locating leaks in a fluid-filled cable. This device relies on measurements of the fluid contained to determine the location of the leak. This invention requires that the fluid be static and also requires valves to be opened and closed while fluid measurements are taken. The invention of this application relies on fluid measurements in a flowing fluid and requires no altering of the fluid flow through adjustment of valves to determine the leak's location. Thus, the leak location device of this application can operate without a human operator overseeing the leak location process and can occur when the fluid is in motion.

The patent to Anway is also of interest in that it is capable of locating and detecting a leak in a fluid pipeline. The Anway invention uses a vibration detector which detects the vibrations associated with a leak. The invention of this application is distinguishable in that it relies on measurements taken from the fluid itself as opposed to vibrational measurements from the pipeline.

The patent to Hogan is capable of determining the location of a leak in a fluid-filled pipeline. The Hogan invention requires that an apparatus be passed through the interior of the pipeline to determine the leak's location. The invention of this application is capable of leak location without requiring that any apparatus be placed within the pipeline.

The remaining prior art references diverge even more starkly from the instant invention than those described particularly hereinabove.

SUMMARY OF THE INVENTION

A method and system (apparatus) are described for determining the location of a leak in a pipeline. The leak is located by the processing of measurements of the operating conditions of the pipeline before and after the occurrence of a leak.

The present invention is based on the observation that a pipeline has only two degrees of freedom with which to adjust to a disturbance such as a leak. The pipeline pressure may change, the flow may change, or both may change. If the pipeline is monitored near a constant flow boundary, the pressure must change. If the pipeline is monitored near a constant pressure boundary, the flow must change. Near a device that produces changes in both flow and pressure, both will change.

This method of leak location involves sensing the pressure and velocity of the fluid in the pipeline at various points. Events which create pressure fluctuations and flow rate changes which correspond to the occurrence of a leak must be detected. Finally, one of various algorithms can be used to interpret the data received from the sensors to establish the location of the leak.

In one form the present invention incorporates a sensing device for pressure and a sensing device for velocity at each end of the pipeline segment on which leaks are to be located. The signal from each sensing device is monitored using the "Pressure Point Analysis" algorithm disclosed in U.S. Pat. No. 4,796,466. The pressure and velocity signals at each end are then combined mathematically to produce a composite signal in which changes in velocity and changes in pressure both contribute to the output signal which is then used as the input to the leak location algorithm.

Velocity Sensing

Previous methods of determining velocity for leak detection have relied on conventional flow meters. Typically positive displacement meters, turbine meters, or differential head producing devices such as orifices or venturi tubes, have been used. These devices all obstruct flow in the line such that inspection or cleaning pigs can not pass therebeyond. These devices are also expensive to procure, install, and maintain.

The present invention can make use of data from conventional flow meters but can also use a much simpler and less expensive meter in which a low range differential pressure transmitter is attached to the pipeline with its high and low inputs separated by a few feet. This differential pressure transmitter then reads the friction pressure drop across the pipe between its points of connection. While this pressure drop is very small, less than an inch of water in many applications, it is easily measured by modern instruments, many of which are capable of producing a full scale output for differential pressures as low as 0.2 inches of water.

Measuring flow with this arrangement requires characterizing the output signal of the transmitter for the pressure drop characteristics of the pipe and the flow regime existing in the pipe section. The techniques for doing this alone are a well developed part of contemporary fluid mechanics.

Because of the way the "Point Analysis Algorithm" described in U.S. Pat. No. 4,796,466 operates, it is not necessary that the meter used to measure absolute velocity be accurate. It must only be sensitive to changes in velocity.

Pressure Sensing

Currently existing methods of pressure determination are effective in indicating both the occurrence of and location of a leak. If differential pressure transmitters are used to gauge flow rate, one of the two pressure gauges may be used for pressure sensing.

Event Detection

Prompt detection of a disturbance having the characteristics of a leak in the pipeline is crucial to accurate leak location. A variety of leak detectors exist in the art. This method is most conductive to a leak detection method disclosed in U.S. Pat. No. 4,796,466 termed a "Point Analysis Algorithm".

The present invention uses the "Point Analysis Algorithm" as a means of detecting the arrival of an event characterized by the disturbance in velocity and/or pressure that results from a leak. Since this technique statistically qualifies the event detected by the sensors as "unusual" compared with normal pipeline operation, response to non-leak events such as changes in operating point are avoided. The detection threshold criteria can be set as a percentage of the probability an event has been detected. Since the probability calculation as described in the aforementioned patent inherently considers noise level in the pipeline, the event is detected relative to a perturbation from normal operation. Since mathematical differentiation is not a component of this process, the signal-to-noise ratio is not degraded by the process.

As disclosed in the aforementioned patent, the pipeline's observable response to a leak begins with the arrival of the pressure expansion wave at the monitoring equipment. The pipeline remains upset and in transition from the conditions that existed before occurrence of the leak to the condition at which steady operation will again be achieved for several minutes. The "Point Analysis" leak detection system described in the aforementioned patent makes use of several "statistical filters" to detect changes that occur at various rates during the event. This approach is used in the present invention to improve the accuracy of the locating process. In the preferred embodiment, five statistical filters are used at each end of the pipeline, each set for a different number of readings. The locating process begins with the first detection of the event but continues until all filters have responded to it. In this way, even if an initial perturbation is missed entirely, a location can still be determined because of the transient perturbations sensed.

Once the occurrence of a leak is detected, the pressure and flow rate data being collected may be analyzed to determine the location of the leak. Three leak location algorithms are described below which use pressure and flow rate data in new and useful ways to locate pipeline leaks.

Time-based leak location algorithm

The location algorithm works as follows:

1. Initiation

When an event is detected with a user-defined probability of occurrence (which is determined by experience on the particular pipeline of interest) the time of detection of the event is noted ($t_1$) and the location process initiated. If a "Point Analysis Algorithm" is used to detect the leak, the event will be detected by one or more of the statistical filters monitoring the pipeline. The time of event detection is also assigned to each of the "n" statistical filters at the location of first detection for which the output of said filter exceeds the user-defined threshold value. These times are denoted $t_{1n}$, the "1" denoting the station of first detection of the event, and "n" denoting the number of the responding filter.

2. Subsequent responses at the end of first detection (station 1)

Once an event in the line is detected at Station 1 with a high probability using at least one statistical filter, there can be a high confidence an event has actually occurred and is in progress. Consequently, the criteria for marking the response of the slower responding statistical filters can typically be set at lower probabilities. The time at which the output of each successive filter exceeds an assigned value is noted using the same nomenclature described above.

3. Response at the Station of second response (station 2)

The times at which the filters at the station of second response (station 2) reach the same probabilities as the corresponding filters at station 1 are noted.

4. Calculation of location

The location process is based on the time it takes monitored points on either side of the leak to respond to it. The location is based on the equation:

$x = (a\Delta T + L)/2$ Where: "x" is the location from station 1, "L" is the length of the pipeline, "$\Delta T$" is the difference in the end-to-end detection times, and "a" is the velocity of sound in the fluid within the pipeline.

If "n" filters are used at each end of the pipeline it is possible "n" locations will be computed. The locations determined earliest are typically the most accurate since they are based on that portion of the pipeline having a response most intimately associated with the occurrence of the leak. Consequently the most significance should be attached to early possible locations.

Leak location by the method of relative magnitude of response

The response to a leak as observed from changes in pressure and flow on opposite sides of the location of the leak depends in part on the distance the monitors are from the leak. The signal is degraded by distance because of low-pass filtering caused by both the pipeline and the fluid. This has the effect of reducing the rise time of the wavefront as it is propagated along the pipeline. The signal is also diminished in amplitude. This occurs because it does work on the pipeline and the fluid as it propagates and because the low-pass filtering effect tends to average the magnitude of the disturbance. These observations are well-reported in the literature.

This method is based on comparison of the magnitude of corresponding responses at opposite ends of the segment containing the leak to compute a location. The preferred embodiment compares the change in fluid horsepower that occurs at opposite ends of the segment. Comparing energy differentials is another alternative.

Fluid horsepower is computed by multiplying pressure and flow rate data together. In the preferred embodiment, the pressure and velocity signals are combined using an algorithm described by:

$S = 1 - [(1 - Sp)(1 - Sv)]$ Where: "Sp" is the output of the Pressure Point Analysis algorithm for which pressure is the input. "Sv" is the output of the Pressure Point Analysis algorithm for which velocity is the input. "S" is the combined output that serves as the input signal for the leak location algorithm.

The preferred embodiment has the effect of responding to changes in either pressure, velocity or changes in both pressure and velocity. It is tolerant of the loss of either the pressure signal or the velocity signal although the location will be biased away from the end in which one of the signals is missing.

In the simplest embodiment the location is determined using a linear comparison algorithm in which the location is calculated by:

$x = L - dth_{p1}/(dth_{p1} + dth_{p2})$ Where: "x" is the location, "L" is the pipeline length, "$dth_{p1}$" is the change in fluid horsepower at station 1 and "$dth_{p2}$" is the change in fluid horsepower at station 2. This algorithm has the advantage of not requiring the velocity of sound in the fluid.

In practice, it has been demonstrated that linear comparison does not always yield the proper location. The location error depends on the boundary conditions at the ends of the segment. A centrifugal pump as a boundary at an inlet to the segment produces a location that is "short" compared to the proper location and the error increases with distance from the pump. When the inaccuracy presented by non-linearity is not acceptable ordinary mathematical techniques may be used to characterize the response to correct the nonlinearity.

Leak location from data taken only at one end of the segment

It is possible to determine the location of a leak by comparing the phase relationship between pressure and velocity as measured at only one end of the segment containing the leak. This technique requires that the boundary conditions at and near the monitored location be such that the pressure response and the velocity response both be observable.

Generally, the pressure response will lead the velocity response. The amount by which this lead occurs can be used to determine the location of a leak. The phase relationship between pressure and velocity may not be a linear function of distance for all pipeline configurations and boundary conditions. In general, it is necessary to initially know the phase relationship for leaks at one or more locations and generate a characterization curve. These relationships can be determined by monitoring the response to the opening of plural small valves located at one or more locations along the line.

The location algorithm used in the preferred embodiment operates as follows:

1. The baseline values of both pressure and velocity are determined and continuously updated before the detection of a response that could indicate a leak. While there are other methods of doing this, the preferred embodiment uses a moving average computed over a user selectable number of readings (5 in the test apparatus) taking at least two readings prior to detection of the event.

2. The final values of both pressure and velocity are determined by noting that first situation in which the trend in readings remains the same or reverses for a user selectable number of readings (3 in the test apparatus).

3. The pressure and velocity data re normalized against each other. That is, the two sets of data are linearly scaled so they are represented on a 0 to 100 percent range. While this is not mathematically essential, it facilitates comparison.

4. The point in time at which the two curves first diverge is taken to be a first index for the detection process. Divergence can be determined by a variety of means. The point in time at which the two curves first rejoin each other is taken to be a second index.

5. The location is determined by comparing the time between the first index and the second index with calibration similarly obtained by testing the pipeline as described above prior to commissioning the leak location system.

The three separate leak locating algorithms fit coherently into a single package for effective pipeline monitoring. The location determined from data at only one point is effective even when only one station is producing useful data. The relative magnitude of response location algorithm is effective when the monitoring stations are near constant pressure sources or constant flow rate sources and when the speed of sound in the fluid within the pipeline is unknown. The time based location algorithm is effective when the monitoring stations are near constant pressure sources or constant flow rate sources and the magnitudes of pressure and flow rate are unknown and only the time of the disturbance's detection is known. A pipeline operator may choose any or a combination of these algorithms and thus effectively monitor a pipeline for detection and location of leaks for prompt corrective action.

OBJECTS OF THE INVENTION

Accordingly, it is a primary object of this invention to provide a method for locating leaks in a fluid pipeline by merely monitoring pressure and flow rate within the pipeline.

Another object of this invention is to provide a variety of leak locating algorithms allowing an operator to customize the leak location process to his specific sensors for maximum accuracy.

Another further object of this invention is to provide a method of leak detection which can be operated without requiring a hypersensitive expensive gauge or gauges which block the pipeline for the use of cleaning pigs.

Another further object of this invention is to provide a method of pipeline leak location which improves in accuracy with each leak located.

Viewed from a first vantage point it is an object of this invention to provide a method for leak location within a pipeline including defining one or more sensing locations along a pipeline, measuring one or more physical characteristics of the transported fluid therein, determining the magnitude of a lag representing changes in the fluid's measured characteristics caused by a leak and processing the data representing the lag with an algorithm that analyzes the lag and determines the leak's location relative to the sensing locations.

Viewed from a second vantage point it is an object of the invention to provide a method for monitoring fluid pipelines to detect and locate leaks including monitoring various physical characteristics of the fluid in the pipeline at one or more locations, creating signals from the data monitored over time, filtering out noise from the signals, sending the signals from a monitoring station to a processing station, utilizing an equation for determining the location of a leak as a function of the created signals, and analyzing the signals to determine the location of the leak.

DESCRIPTION OF PREFERRED EMBODIMENTS

Figure 1:
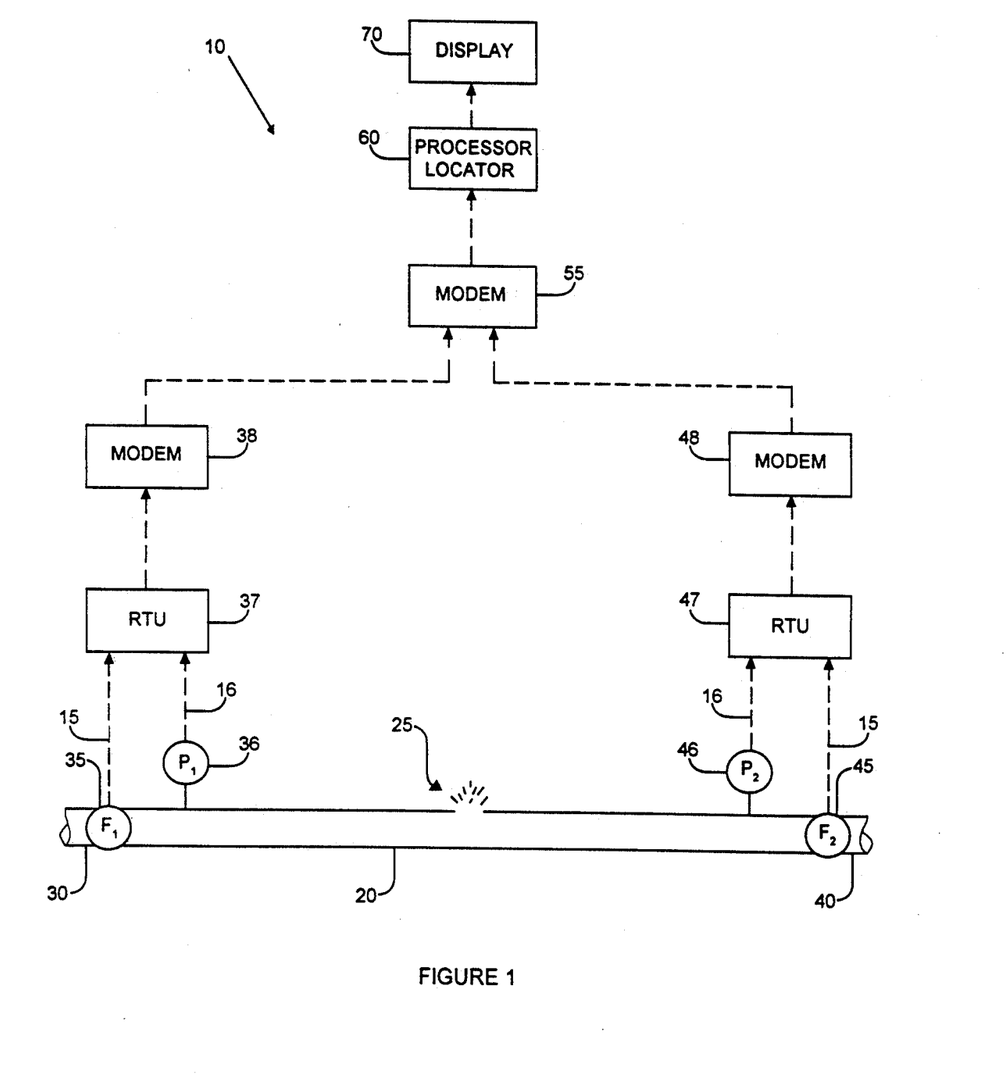
FIG. 1 is a block diagram revealing the physical relationships of separate elements of this apparatus

Referring now to the drawings wherein like reference numerals represent like elements throughout, reference numeral 10 of FIG. 1 is directed to a method and apparatus for leak location in a pipeline 20.

In its essence, the method requires data from a first monitoring station 30 and a second monitoring station 40 on the pipeline 20. The first monitoring station 30 collects data concerning velocity and pressure of the fluid in the pipeline 20 provided by a flow rate gauge 35 and a pressure gauge 36.

Similarly, the second monitoring station 40 collects data concerning velocity and pressure of the fluid in the pipeline 20 provided by a flow rate gauge 45 and a pressure gauge 46.

Data from the flow rate gauges 35, 45 travels to two data collectors 37, 47 which make records of the flow rates at the two monitoring stations 30, 40 at a series of times. The records created by the data collectors 37, 47 are simultaneously sent to two transmitters 38, 48 for transmission of the records to a receiver 55 connected to a data processor 60. The transmitters 38, 48 and receiver 55 can be any of a variety of commonly available communication devices including a phone modem, a fiber optic link, or a microwave system. Concurrently, data from the pressure gauges 36, 46 travels to the two data collectors 37, 47 which make records of the pressures at the two monitoring stations 30, 40 at a series of times. The pressure records created by the data collectors 37, 47 are simultaneously sent to the two transmitters 38, 48 for transmission of the pressure records to the receiver 55 connected to the data processor 60.

The data processor 60 utilizes algorithms which receive pressure and velocity data as input from various stations 30, 40 and outputs the most likely location of a leak 25 relative to the stations' locations.

In general, the gauges 35, 36, 45, 46 at each station 30, 40 include a means for measuring flow, a means for measuring pressure, and velocity data lines 15 and pressure data lines 16 which transmit measurement data finally to the data processor 60.

In applications where pressure at a station 30, 40 cannot change, such as near a pressure control device or a large storage tank, it is not necessary to monitor the pressure at that location. In applications where the flow at a location cannot change, such as near a constant flow device, it is not necessary to monitor the flow at that location. Since the methodology is based on change there is not a need to monitor unchanging parameters.

Once the gauges 35, 36, 45, 46 have sent the measurement signals to the data processor 60, one of three algorithms or a combination of the three algorithms may be used to locate the leak 25. Each of the algorithms is described in detail separately hereinbelow.

Figure 2:
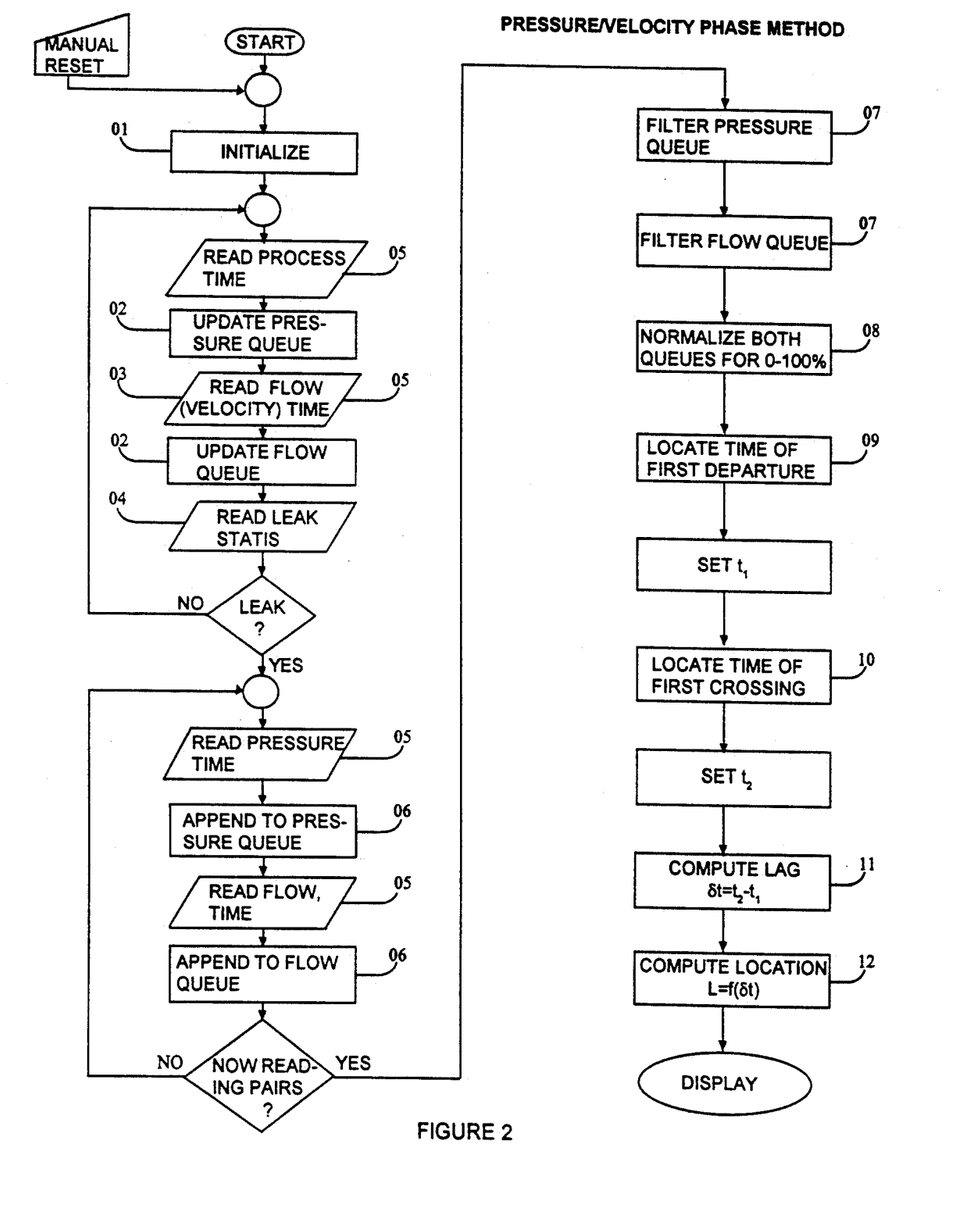
FIG. 2 is a flow chart representing the steps involved in a first leak location algorithm.

Referring now to FIG. 1 and FIG. 2, a first algorithm accomplishes leak location using pressure-velocity phase analysis. This algorithm is capable of determining the location of the leak 25 along a pressurized pipeline 20 by only measuring data from a single monitoring station 30. If more than one monitoring station 30, 40 is available the first leak location algorithm can be refined by pooling the locations determined by the algorithm at each of the monitoring stations 30, 40. One way of pooling the locations' data is by averaging.

The flow rate gauge 35 does not have to be accurate (regarding absolute flow rate) for this algorithm but it must be sensitive (that is, it must respond to small changes in flow) and it must be repeatable (that is, the output in response to a particular flow must always be the same).

The pressure gauge 36 does not have to be accurate for this method but it must be sensitive and repeatable. Suitable instruments include the Rosemount Model 1151GP, Honeywell Model ST 3000, and the Foxboro Model 821. These instruments are commonly used in the pipeline industry.

The pressure gauge 36 should be mounted on the side of the flow rate gauge 35 that is in the direction in which leaks 25 are anticipated. In this way, pressure changes inherent in the operation of the flow rate gauge 35 do not become a factor in the leak location process. If the flow rate gauge 35 produces turbulence that affects the pressure reading, the pressure gauge 36 should be mounted a distance from the flow rate gauge 35 such that the effect of the disturbances is diminished.

The data processor 60 which provides a means for processing the pressure and flow data (and thus locating the leak) may be constructed from any collection of components capable of performing the algorithm described in FIG. 2. The preferred embodiment uses a digital computer but an electronic or pneumatic analog computer or a collection of electronic or pneumatic components could be used.

Figure 3:
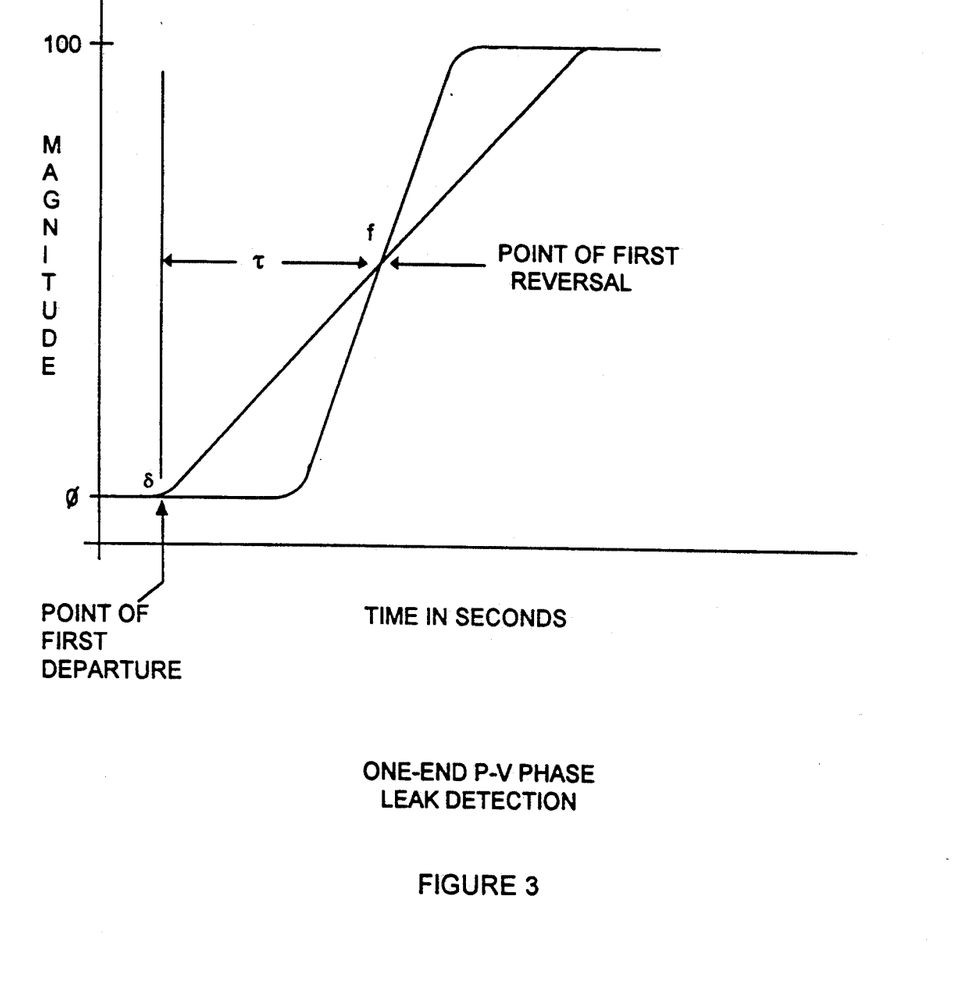
FIG. 3 is a graph revealing details in the operation of the first leak location algorithm of this method.

The algorithm determines the leak's location on the basis of the difference in the rate at which pressure and velocity change at the monitoring station 30 (See FIG. 3). The more closely in time the changes in pressure and velocity occur, the closer the leak 25 is to the monitoring station 30.

The preferred embodiment accumulates a set of data incorporating a series of readings from the gauges 35, 36 taken before the occurrence of the leak 25 and for several minutes after the leak's occurrence. The data are then processed using this algorithm.

To directly compare the time relationship of pressure and velocity data it is convenient to first normalize them to a common base. In the preferred embodiment, this is done by assigning the initial "pre-leak" value of each to be zero percent. The absolute value of the changes from the initial values to the final steady state values (or the values at some point in time after the leak 25 is well developed) are then computed. The magnitude of each change is assigned to be 100 percent. The intermediate values are then linearly scaled between zero percent and 100 percent of the amount by which each changed. The result is a set of flow readings and a set of pressure readings each scaled between zero percent and 100 percent. All further comparisons are made using these data.

The normalized pressure and velocity data sets are then used to compute the phase difference between them. That is, the time interval $\tau$ between corresponding points on each waveform. There are various ways of doing this and the algorithm itself is not sensitive to which one is selected although practical measurement and computational considerations favor methods that use longer intervals of time. The preferred embodiment uses the time between the point at which the curves first diverge (as represented by the time at which one of them first departs from the zero percent baseline) and the first time at which they are both equal to 100 percent.

An alternate embodiment can be used with success and is less sensitive to the selection of the duration after the initiation of the leak over which readings are accumulated. This embodiment uses the same starting point described above but establishes the second time on the basis of the first instance at which the two curves cross or become equal (also shown in FIG. 3). This embodiment has the disadvantage of having to resolve shorter intervals of time than the method of the preferred embodiment. Resolving shorter intervals of time is generally more difficult in digital systems since the speed at which the program executes becomes more significant.

The distance of the leak 25 from the monitoring station is a function of the time computed. The further away the leak 25 the longer the time $\tau$. In order to convert the time $\tau$ to a distance it is necessary to calibrate the algorithm for operation on the specific pipeline 20 of interest.

Calibration according to the preferred embodiment uses a third order polynomial in which the time interval $\tau$, as computed above, is the independent variable. The dependent variable is the leak's location in whatever units the user prefers. Use of a third order polynomial for calibration provides the ability to automatically calibrate non-linearities out of the system. While a third order polynomial has been found to produce good results, other calibration techniques, including a simple linear one, also work.

The coefficients of this polynomial are determined by regression based on data acquired experimentally on the actual pipeline 20. In essence, a series of tests are performed in which the location of a simulated leak is known. The phase difference times $\tau$, computed as described above, are computed by the algorithm and the corresponding locations are provided to it. Regression coefficients are then computed using the Method of Least Squares and Gauss-Jordan Elimination, both of which are well reported in the literature.

This algorithm is also sensitive to the rate at which readings are acquired. This is increasingly true as the distance to the leak 25 becomes short. Reasonable performance on a fifty mile long segment has been demonstrated using a one-half second update rate (time interval before taking a new reading) but results improve markedly as the update rate increases.

Figure 8:
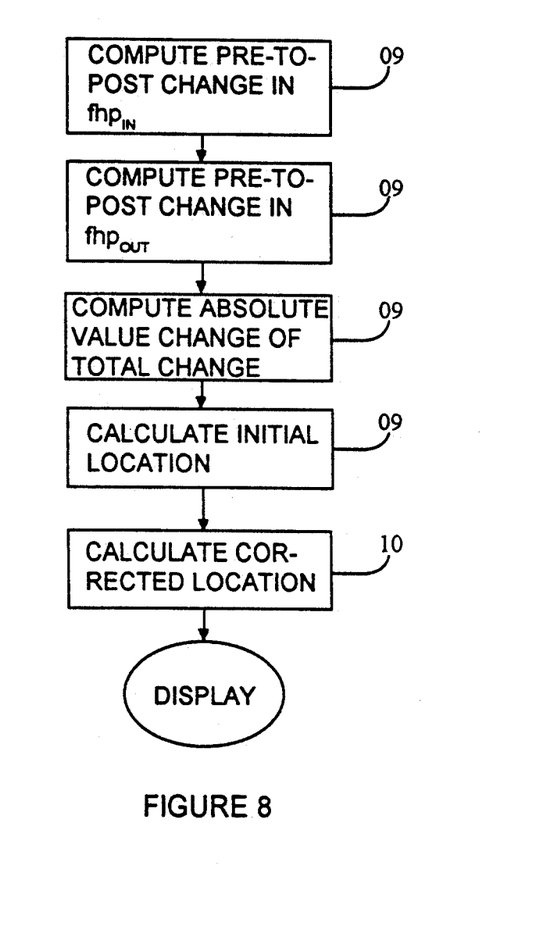
FIG. 8 is a flow chart representing a possible modification to the leak location algorithms of this method.

A refinement of the calibration mechanism, involving a separate algorithm, incorporates a means for providing the correct location data to the algorithm after each subsequent location process. Each time new data is provided, the polynomial equation's coefficients are recomputed and thus accuracy is enhanced. This accuracy refinement algorithm is shown in FIG. 8.

A further refinement of the calibration mechanism incorporates a procedure in which the coefficients of the calibration polynomial are made functions of the current operating (e.g., the pressure and/or flow rate) conditions. In this way, the calibration equation is made to consider the effects of variable operating conditions. This is generally not an important refinement for this first algorithm.

Figure 4:
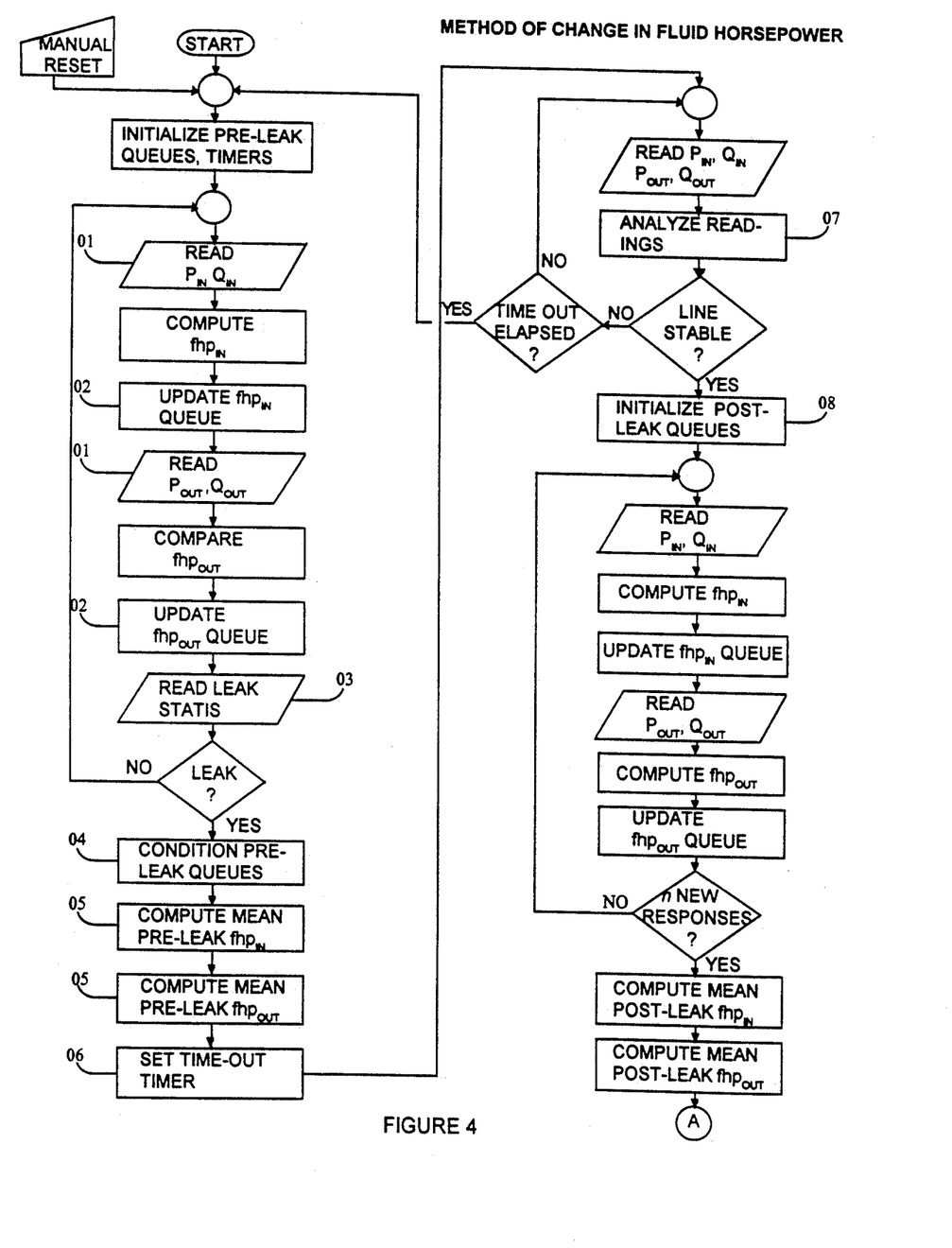
FIG. 4 is a flow chart representing the steps involved in a second leak location algorithm.

Referring now to FIG. 1 and FIG. 4, a second algorithm accomplishes leak location by monitoring changes in fluid horsepower. This algorithm locates a leak 25 in terms of the "hydraulic length" of the pipeline 20 referred to generally as the span between a first Station 30 and a second Station 40. The methodology is not sensitive to the direction of flow.

"Hydraulic length" is the equivalent length of straight, constant-diameter pipe that would produce the same hydraulic behavior as the collection of pipe of various sizes, fittings, bends, and other equipment and devices existing in an actual piping system.

Preferably this method utilizes gauges 35, 36, 45, 46, distributed as shown in FIG. 1, but it will work if only the more important parameter at each location is monitored. The more important parameter is the one (either pressure or flow) that changes the most when a leak 25 occurs. This single parameter monitoring is not preferred since it can result in precision that is significantly poorer than that which would be possible if both flow and pressure were monitored.

The flow rate gauges 35, 45 do not have to be "accurate" in an absolute sense but must be sensitive to small changes in flow. Since this algorithm relies on changes and on ratios-of-changes, all constants and biases are inherently eliminated. A neural network correction device is incorporated into the algorithm so most non-linearities can be corrected. While sensitive and accurate flow rate gauges 35, 45 can be used, any instrument that responds to small changes in flow is adequate.

The pressure gauges 36, 46 do not have to be accurate but must be sensitive to small changes in pressure. Such instruments are represented by products such as the Rosemount Model 1151GP, The Honeywell Model ST 3000, and the Foxboro Model 821. These instruments are commonly used in the pipeline industry.

The pressure gauges 36, 46 should be selected and calibrated in accordance with good engineering practice. The pressure readings normally expected should fall in the upper two-thirds of the instrument's calibrated span. If damping is used at all it should be adjusted to the shortest time constant that will produce reasonably stable data.

The pressure gauges 36, 46 should preferably be placed between the flow rate gauges 35, 45. Neither of the two flow rate gauges 35, 45 should preferably be installed between the locations of the pressure gauges 36, 46. This eliminates pressure fluctuations across the flow gauges 35, 45 appearing in the pressure measurements.

For practical considerations of space, maintenance and economy the associated pressure and flow instruments may be installed near each other. If the flow gauges 35, 45 produce turbulence on the side on which the pressure gauges 36, 46, are to be placed, each pressure gauge 36, 46 should be placed far enough away so that the disturbances do not adversely affect the readings.

The data lines 15, 16 are used to get the data input monitored by the pressure and flow gauges 35, 36, 45, 46 to the data processor 60 which utilizes the algorithm discussed below. In general, the data lines 15, 16 must have sufficient bandwidth to support proper operation of the second leak location algorithm. In the preferred embodiment, the data processor 60 is a small digital computer which is inherently a sampling (e.g., "reading by reading") device. It has been found that a sampling interval of approximately one-half second produces acceptable results. Longer sampling intervals are possible especially with fluids in which the speed of sound is low, such as gasses.

The leak location apparatus consists of any system capable of receiving data from the monitoring stations 30, 40, and performing the algorithm disclosed herein. These functions are within the capabilities of digital computers and the use of one is envisioned in this invention. These functions could also be performed by an analog computer or by a collection of discrete electronic or pneumatic components.

Preferably, fluid horsepower is used as the location parameter for the second algorithm. Fluid horsepower is calculated by multiplying pressure and flow rate data. Any parameter, however, which incorporates a means for considering each property of the fluid system for which there is a degree of freedom during a leak 25 will work for this algorithm. One example is total system energy.

Before the leak 25 occurs it is necessary to determine initial values for the fluid horsepower as monitored at each of the two stations 30, 40. Since there is generally some variability in the successive readings one obtains it is desirable to use some smoothing algorithm over a number of readings. There are no special demands on these algorithms except that the smoothing algorithms used at the two stations 30, 40 should produce comparable results. It is also important that the averaging period not be so long that normal changes in pipeline operation be obscured. The preferred embodiment uses an averaging algorithm which computes the moving average of a small number of readings, typically 3 to 30, depending on the degree of variability of the data (highly variable data requiring a larger number of readings) taken such that the most recent reading in the moving average is the one just prior to the disturbance from the leak 25 first reaching a monitoring station 30, 40.

When a leak 25 is detected the fluid horsepower readings acquired as described above are saved and a procedure initiated by the data processor 60 to determine the conclusion of the initial transience produced by the leak 25.

The occurrence of a leak 25 may be detected by any means. The preferred embodiment uses the Pressure Point Analysis technique disclosed in U.S. Pat. No. 4,796,466.

The initial transient response of the pipeline 20 includes creation and propagation of a pressure expansion wave and a transition in fluid flow velocity from the original value to some new value consistent with the hydraulic load imposed on the pipeline 20 by the leak 25.

The pressure disturbance begins at the leak 25 and travels in both directions away from the leak 25 toward the ends of the stations 30, 40. The pressure disturbance propagates at the speed of sound in the fluid as constrained by the pipe 20. This velocity is somewhat lower than the speed of sound would be in the free uncontained fluid. The magnitude of the pressure disturbance depends upon pipeline operating conditions, the characteristics of the fluid and the magnitude of the leak 25. The characteristics of the pressure disturbance that may be observed at any specific monitoring station 30, 40 depend on the above factors and additionally on the boundary conditions (e.g., controlled pressure or controlled flow) near the monitoring station 30, 40 and the distance the monitoring station 30, 40 is from the leak 25. As the pressure wave propagates along the pipeline 20 its magnitude decreases and the steepness of the wavefront decreases.

The second leak location algorithm requires that the fluid horsepower be known before the leak 25 and at some point in time after the leak 25 has developed. It is desirable but not essential that the second time be after the pipeline 20 has achieved a new steady state with the leak 25. It is important however that the criteria for determining the second time be consistent from leak 25 to leak 25. It is desirable from the point of view of practical operation, that this second time be as close as possible to the occurrence of the leak 25 since that results in the fastest possible discernment of the location of the leak 25.

The second value of fluid horsepower is computed independently at each monitoring station 30, 40. In the preferred embodiment, the second value is determined by the averaging procedure used to determine the initial fluid horsepower except the series so averaged begins when the criteria indicating the end of the event have been satisfied and continues for the specified number of readings. In the preferred embodiment the end-of-event criteria used are that the value computed for the fluid horsepower either remains the same or reverses its direction of change for a specific number of successive readings. The number of successive readings used depends on the characteristics of the particular application. The value is typically three to ten readings.

The location process requires the fluid horsepower before the leak 25 and the fluid horsepower at some time after occurrence of the leak 25 at each monitoring station 30, 40. These values are used to determine an initial location which is then used to determine a corrected location. The correction algorithm may be tuned to improve the accuracy of subsequent corrected locations. The correction algorithm is described in detail in FIG. 8.

Figure 5:
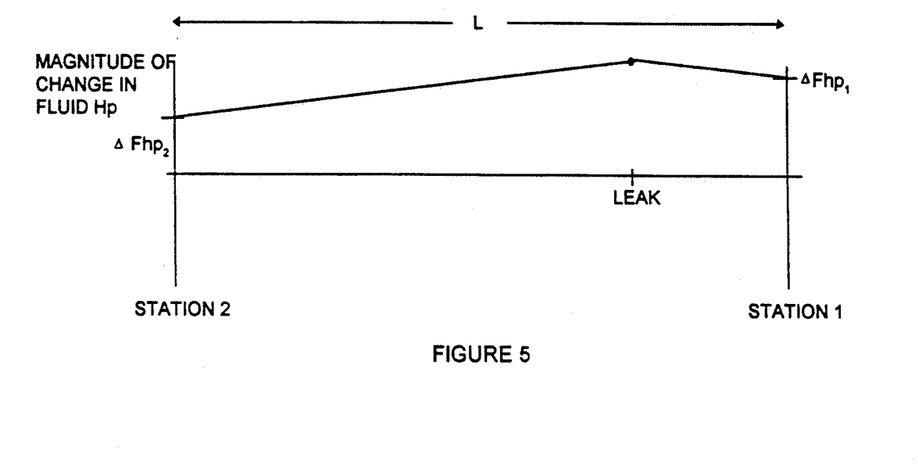
FIG. 5 is a graph revealing details in the operation of the second leak algorithm of this method.

The computed location is based on the observation that the magnitude of a pipeline's response to a leak-like event changes with distance from the leak 25. (See FIG. 5). The preferred embodiment computes the location in percent of the hydraulic length of the pipeline segment 20. The leak 25 is located from the first monitoring station 30 by first computing the absolute value of the change in the fluid horsepower that occurred during the pipeline's initial response to the leak 25 at each of two monitoring stations 30, 40. The change thusly computed at the second monitoring station 40 is divided by the sum of the changes at both monitored locations 30, 40. The result, when multiplied by 100, is the percentage of the hydraulic length of the pipeline 20 that the leak 25 is from the first station 30.

Various effects resulting from specific pipeline 20 and boundary condition characteristics can render the linear computation procedure described above somewhat inaccurate. When this is found to be the case, a model can be used which is based on a third order polynomial in which the computed location is the independent variable. The dependent variable is the corrected location.

The polynomial coefficients are determined by regression. The preferred embodiment uses the Method of Least Squares and the Gauss-Jordan Elimination Procedure both of which are well reported in the literature. Data for the regression are supplied by tests on the actual pipeline 20 on which leak locations are to be determined. It is important to the regression procedure that the end point values (e.g., zero percent and 100 percent) be included in the data set because this is a requirement of the polynomial regression procedure.

A further correction mechanism algorithm, shown in FIG. 8, uses a feedback technique in which actual locations of leaks 25 or simulated leaks are supplied to the correction algorithm after it has computed a location. The regression coefficients are automatically recomputed thus refining the accuracy of the location process.

A further refinement of the correction mechanism uses a procedure in which the coefficients of the correction polynomial are made functions of current operating conditions (e.g., pressure and/or flow rate). In this way the correction procedure may be automatically adjusted to compensate for operating-point-dependent non-linearities.

Figure 6:
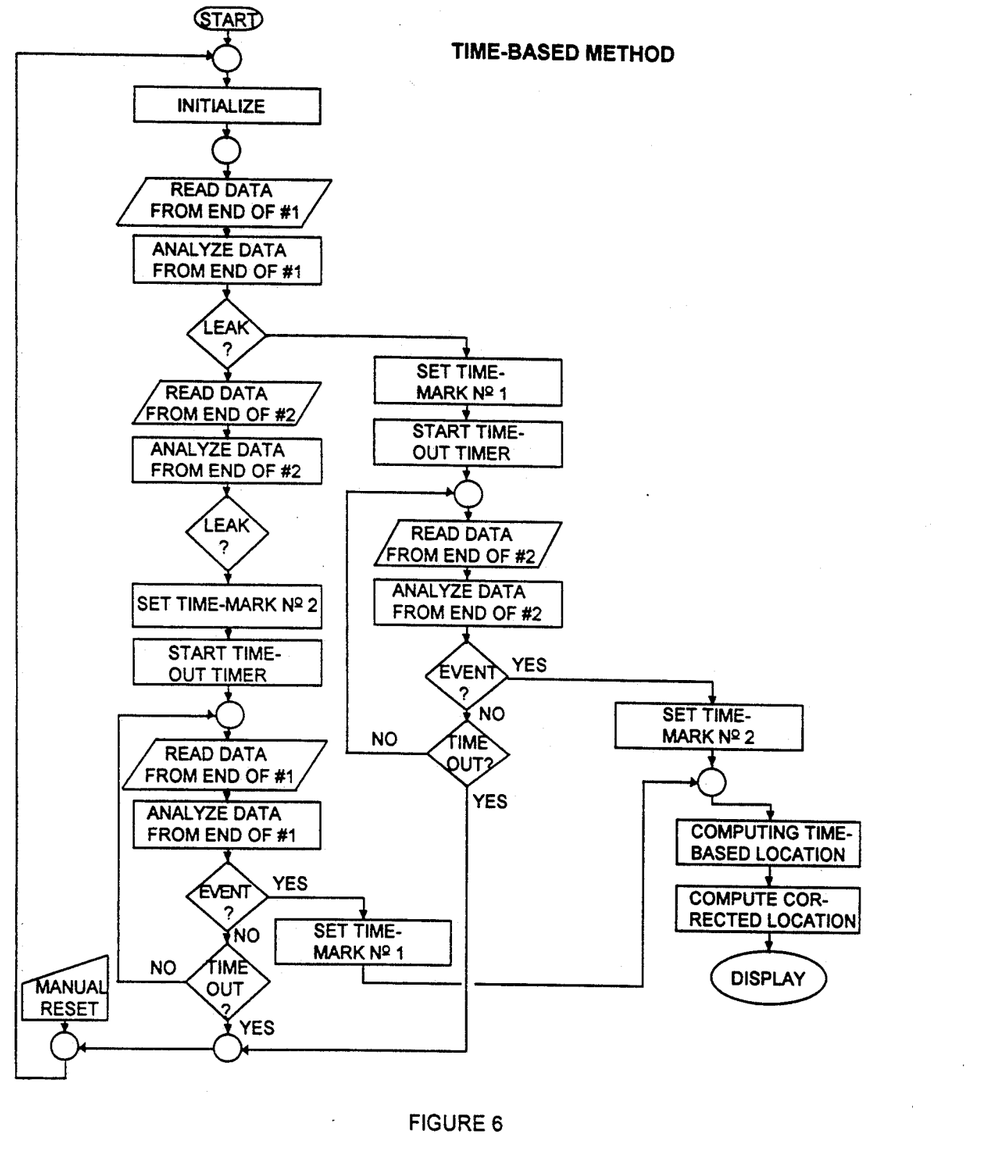
FIG. 6 is a flow chart representing the steps involved in a third leak location algorithm.

Referring now to FIG. 1 and FIG. 6, a third algorithm accomplishes leak location using wave propagation times. This algorithm is based on a well-understood phenomenon. When a leak 25 occurs, a pressure expansion wave is created at the location of the leak 25. It travels upstream and downstream away from the leak 25 at, nominally, the speed of sound in the fluid in the pipeline 20. If a means for detecting this expansion wave is located upstream and downstream of the leak 25, the location of the leak 25 can be determined from the following relationship:

$$x = 0.5 [a(t_1 - t_2) + L]$$

Where:

x is the distance to the leak from the first monitoring station 30 a is the velocity of sound in the fluid $t_1$ is the time the wave is sensed at the first monitoring station 30

$t_2$ is the time the wave is sensed at the second monitoring station 40

L is the distance from the first monitoring station 30 to the second monitoring station 40.

Figure 7:
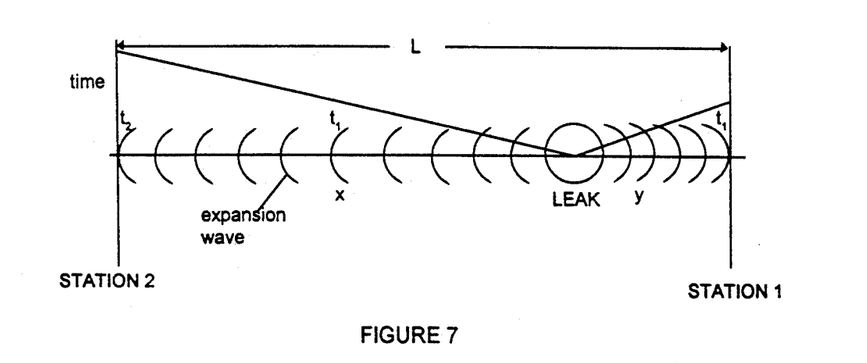
FIG. 7 is a graph revealing details in the operation of the third leak location algorithm of this method.

The accuracy of the location depends on the precision with which the critical parameters, mainly a, $t_1$ and $t_2$ can be determined. (See e.g. FIG. 7)

The velocity of sound, a, in the fluid in the pipeline 20 depends mainly on the composition of the fluid, its temperature, and its pressure. It also depends on the properties of the pipeline 20 itself. Generally, it is best to determine the value of a by experiment.

Determination of $t_1$ and $t_2$ has generally been approached by triggering a timing mechanism upon detection of the pressure expansion wavefront. Detection of the wavefront has typically been defined as some threshold value having been exceeded. The reliability of the location process depends on the wavefront being detected at each monitoring station 30, 40. The accuracy of the location determination algorithm's output depends on the precision with which $t_1$ and $t_2$ are determined and how close these times are to corresponding points on the expansion waves as seen at the two monitoring stations 30, 40.

The expansion wave can be distorted by nearby boundary conditions (constant pressure or constant flow devices). The expansion wavefront is naturally distorted by the normal effects of wave propagation in the pipeline 20. As the wave travels along the pipeline 20 its amplitude diminishes and the steepness of the wavefront decreases. This can make it difficult to trigger timing mechanisms at corresponding points on the expansion wavefronts as seen at the two monitoring stations 30, 40.

The present invention improves the performance of the algorithm described above by improved sensing of the pipeline 20 for evidence of the disturbance caused by the leak 25. This is done by, in the most general case, monitoring both pressure and velocity at each of the two monitoring stations 30, 40.

Monitoring both pressure and velocity addresses the problems with nearby boundary conditions. Since the first order response of the fluid to a leak 25 in the pipeline 20 is limited to two degrees of freedom (change pressure or change velocity) one or both will always change. If there is a nearby constant pressure boundary that prevents pressure from changing, the flow will change. When there is a nearby constant flow boundary, the pressure will change.

In a configuration in which one parameter (either pressure or velocity) can not change in response to a disturbance it is only necessary to monitor the other. Monitoring both is necessary when the pipeline's response may include both a pressure and a velocity component.

The data thus monitored are processed using Statistical Filters as described in U.S. Pat. No. 4,796,466. One point analyzer incorporating five statistical filters, each with different numbers of sample readings is used for each monitored value.

The probability outputs from the two point analyzers obtained at each monitoring station 30, 40 are then statistically pooled. The times $t_1$ and $t_2$ are then determined when the pooled probabilities, as calculated at each monitoring station 30, 40, first exceed a certain value.

Using Statistical Filters (as disclosed in the above-mentioned patent) aids differentiation of the disturbance of interest from background noise. The statistical process used in the Statistical Filter normalizes differences in readings to the background noise and consequently attaches significance only to changes that are significant relative to the background noise.

Because the object of the sensing and detection systems is to determine the arrival of the disturbance generated by the leak 25 at each monitoring station 30, 40, perturbations in velocity, pressure or both are suitable for determining the arrival times. An effective way of automatically dealing with detecting these disturbances in a general way is to statistically pool the probabilities that a disturbance has been detected. This is done by a statistical procedure. The overall probability a disturbance has been detected is computed as:

$$P_t = 1 - ](1 - P_p)(1 - P_v)]$$

Where:
Pt is the total probability
$P_p$ is the probability computed for the response to pressure changes
Pv is the probability computed for the response to velocity changes.

Times $t_1$ and $t_2$ for the location equation presented above represent the times the total probabilities computed at each monitoring station 30, 40 reach certain values. The specific values are selected for each specific application on the basis of the characteristics of the point analyzer's response to noise in the measurements. For best location accuracy, the probabilities used to trigger the time determination are as small as possible. A value of 50 percent has been used effectively.

The flow rate gauges 35, 45 does not have to be accurate but they must be sensitive to small changes in flow. Since the Statistical Filters detect changes from baseline conditions, constants and biases are inherently eliminated. While sensitive and accurate flow gauges 35, 45 can be used, any instruments that respond to small changes in flow are adequate.

The pressure gauges 36, 46 does not have to be accurate but they must be sensitive to small changes in pressure. Fortunately it is not difficult to find instruments that are both sensitive and accurate. Such instruments are represented by products such as the Rosemount Model 1151GP, The Honeywell Model ST 3000, and the Foxboro Model 821. These instruments are commonly used in the pipeline industry.

The pressure gauges 36, 46 should be selected and calibrated in accordance with good engineering practice. The pressure readings normally expected should fall in the upper two-thirds of the instrument's calibrated span. If damping is used at all it should be adjusted to the shortest time constant that will produce reasonably stable data.

It is important that the pressure measurements be made between the flow rate gauges 35, 45. Neither of the two flow rate gauges 35, 45 should be installed between the locations of the pressure gauges 36, 46. This methodology eliminates pressure fluctuations across the flow rate gauges 35, 45 appearing in the pressure measurements.

For practical considerations of space, maintenance and economy the associated gauges 35, 36, 45, 46 are installed near each other. If the flow rate gauge 35, 45 produces turbulence on the side of it on which the pressure gauge 36, 46 is to be placed, the pressure should be placed far enough away so the disturbances do not adversely effect the readings.

The data lines 15, 16 are used to get the data monitored by the pressure and flow rate gauges 35, 36, 45, 46 to the data processor 60 which utilizes the third algorithm discussed herein. In general, data lines 15, 16 must have sufficient bandwidth to support proper operation of the third leak location algorithm. In the preferred embodiment, the data processor 60 is a small digital computer which is inherently a sampling (e.g., reading by reading) device. The shorter the sampling interval the better the location accuracy.

The data processor 60 consists of any system capable of receiving data from the monitoring stations 30, 40 and performing the algorithm discussed herein. These functions are within the capabilities of digital computers. These functions could also be performed by an analog computer or by a collection of discrete electronic or pneumatic components.

The leak location means (and, as discussed above, the data lines 15, 16) must operate with sufficient speed to resolve the wavefront arrival times $t_1$ and $t_2$ with sufficient accuracy to meet the leak location accuracy objective. The sampling rate will produce an error in the determination of the difference in times $t_1$ and $t_2$ that can be as much as twice the sampling period. The location error is then the distance the wavefront could have traveled during a sampling period which is found by multiplying the velocity of sound by the sampling interval expressed in seconds.

While FIG. 1 shows a basic structure capable of leak location by any of the three algorithms described, the structure may be modified for different pipelines 20. One possible modification is to provide many additional monitoring stations (not shown) periodically along the pipeline 20. Leak location results from each station could then be combined to produce a more accurate final location.

After computing the leak location, the data processor 60 communicates with a display 70 capable of communicating the information to an operator. The data processor 60 can simultaneously send separate results from the three algorithms to the display 70. Also, the data processor 60 can average the outputs of the three algorithms and send this location to the display 70. In this way, an operator can make an informed decision as to the most likely location of the actual leak 25.

Furthermore, the data processor 60 can signal an automatic switching system capable of modifying pipeline 20 flow in response to the leak 25. For instance, flow could be diverted around a leak 25 or flow could be halted by shutting a valve upstream from the leak 25. Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method for determining the location of a leakage of a transported fluid from a pipeline, the steps including:
    defining one or more monitoring locations along a pipeline, and
    monitoring, at one or more of these monitoring locations, one or more physical characteristics of the transported fluid prior to an occurrence of a leak to establish baseline values of these characteristics, and
    monitoring the physical characteristics after the occurrence of a leak so that differences between the monitored characteristics before and after the occurrence of a leak are identified, and
    collecting data representing the differences in the monitored physical characteristics that occur as a result of the leak, the data including measured values of the physical characteristics and a sequence corresponding to when each physical characteristic was recorded, and
    processing the data representing the differences in the monitored physical characteristics that occur as a result of the leak using an algorithm that determines the leak's location relative to the monitoring location; and
    wherein the monitored physical characteristics are selected from a group including fluid pressure and fluid flow rate.

2. The method of claim 1 in which the algorithm of said processing step is tunable to the pipeline being monitored through the steps of:
    observing the location computed of a previous leak on the pipeline using the algorithm, and
    determining the actual location of the previous leak on the pipeline, and
    adjusting the processing algorithm to correct a computed location of the previous leak thereby adapting the algorithm to the specific characteristics of the pipeline.

3. The method of claim 2 wherein the previous leak is an actual leak of known location.

4. The method of claim 2 wherein the previous leak is a simulated leak of known location.

5. The method of claim 1 in which the difference analyzed by the algorithm is the difference in the speed of response of the monitored pressure and the speed of response of the monitored rate of flow, both observed at the same monitoring location.

6. The method of claim 5 comprising the steps of:
    determining the difference in the speeds of the pipeline's pressure response and flow rate response to a leak, and
    calculating a value for the location of the leak, and
    correcting the calculated value to account for the characteristics of the pipeline by:
    observing the location computed of a previous leak on the pipeline using the algorithm, and
    determining the actual location of the previous leak on the pipeline, and
    adjusting the processing algorithm to correct the computed location of the leak thereby adapting the algorithm to the specific characteristics of the pipeline, and
    outputting the corrected location of the leak;
    whereby the leak is located for efficient repair and cleanup.

7. The method of claim 1 wherein establishing the baseline values and after-leak properties of the monitored characteristics, and the differences between them, utilizes statistical filtering which distinguishes between mere pipeline noise and a change resulting from a leak.

8. The method of claim 7 in which the difference analyzed by the algorithm is the ratio of the difference in the absolute value of the change in the product of pressure and rate of flow at one monitored location to the absolute value of the total change in the product of pressure and rate of flow at that monitored location and a second monitored location, the second location being so positioned that the leak lies between the two monitored locations.

9. The method of claim 8 comprising the steps of:
determining the product of the pressure and the rate of flow at the first monitoring location before the occurrence of a leak, and
determining the product of the pressure and the rate of flow at a second monitoring location before the occurrence of a leak, and
determining the product of the pressure and rate of flow at the first monitoring location after the pipeline's response to a leak is complete, and
determining the product of the pressure and rate of flow at the second monitoring location after the pipeline's response to a leak is complete, and
calculating the location of the leak as a percentage of the distance between the two monitored locations, and
correcting the calculated value to account for the characteristics of the pipeline, by:
observing the location computed of a leak on the pipeline using the algorithm, and
determining the actual location of the leak on the pipeline, and
adjusting the processing algorithm to correct the computed location the leak thereby adapting the algorithm to the specific characteristics of the pipeline, and
outputting the corrected location:
whereby the leak is easily located for efficient repair and cleanup.

10. The method of claim 7 in which the difference analyzed by the algorithm is the difference in time between sensing of a change in value of a monitored characteristic resulting from a leak at a first monitored location and sensing of a change in value of a monitored characteristic resulting from the leak at a second monitored location.

11. The method of claim 10 comprising the steps of:
determining the time at which a change in value of a monitored characteristic is observed at a monitored point, and
determining the time at which a change in value of a monitored characteristic is observed at a second monitored point, said change occurring because of the leak, and
inputting the distance between the two sensing locations, and
inputting the velocity of sound in the fluid in the pipe, and
computing the location of the leak, and
outputting the computed location of the leak,
whereby the leak is easily located for efficient repair and cleanup.

12. The method of claim 11 wherein the monitored characteristics at the first monitored location and the monitored characteristics at the second monitored location are any combination of characteristics taken from a group consisting of:
fluid pressure, and
fluid rate of flow.

13. A method for determining a location of a leakage from a pipeline, the steps including:
monitoring various physical characteristics of a fluid in the pipeline at one or more monitoring locations, and
creating signals from data representing the physical characteristics of the fluid in the pipeline monitored over time, and
sending the signals from the monitoring locations to a processing location, and
preparing a mathematical algorithm for determining the location of the leakage as a function of the created signals, and
analyzing the signals using the mathematical algorithm to determine the location of the leakage, and
wherein said monitoring includes:
measuring a pressure of the fluid and measuring a flow rate of the fluid; and
wherein said creating step includes:
creating a pressure signal representing fluid pressure and creating a flow rate signal representing fluid flow rate.

14. The pipeline monitoring method of claim 13 wherein said analyzing is done statistically including utilizing multiple floating average values for the data represented by the signals.

15. The pipeline monitoring method of claim 14 wherein said preparing of the algorithm includes:
normalizing the pressure signal and the flow rate signal so that a pre-leak steady state value of both the pressure signal and the flow rate signal is considered zero percent (0%) of transition and a post-leak steady state value of both the pressure signal and the flow rate signal is considered one hundred present (100%) of transition,
opening a valve of known location on the pipeline, thus creating an artificial leak thereat,
determining an elapsed time between when a first of the pressure signal and the flow rate signal to change begins to change from zero percent (0%) of transition and when a second of the pressure signal and the flow rate signal to change reaches a percentage of transition equal to a percentage of transition of the first of the pressure signal and the flow rate signal,
establishing a data set representing both the elapsed time and the location of the leak,
repeating the steps of opening a valve, determining an elapsed time and establishing a data set with a different valve of known location open until a plurality of data sets are established,
fitting a curve to the data sets obtained, and
establishing an equation for the curve where leak location is a function of the elapsed time.

16. The pipeline monitoring method of claim 15 wherein said analyzing further includes:
normalizing a pressure signal and a flow rate signal corresponding to an unknown leak so that a pre-leak steady state value of the signals is considered zero percent (0%) and a post-leak steady state value of the signals is considered one hundred percent (100%),
determining an elapsed time from when the first of the pressure signal and the flow rate signal to change begins to change from 0% and when the second of the pressure signal and the flow rate signal to change reaches the same percentage of transition as the first of the pressure signal and the flow rate signal,
inserting the elapsed time into the equation, and
outputting a leak location.

17. The pipeline monitoring method of claim 14 wherein said preparing of the algorithm includes:

measuring a hydraulic length of the pipeline between two monitoring locations, establishing an equation for leak location by multiplying the hydraulic length by a ratio of a change in fluid horsepower at a first monitoring location to a sum of changes in fluid horsepower at the first monitoring location and a second monitoring location.

18. The pipeline monitoring method of claim 17 wherein said analyzing includes:
determining a pre-leak fluid horsepower at the first monitoring location and determining a pre-leak fluid horsepower at the second monitoring location,
determining a post-leak fluid horsepower at the first monitoring location and determining a post-leak fluid horsepower at a second monitoring location,
calculating the change in fluid horsepower at the first monitoring location and calculating the change in the fluid horsepower at the second monitoring location,
inserting the calculated changes in fluid horsepower into the equation established in said establishing step, and
outputting a distance from the first monitoring location to the leak.

19. The pipeline monitoring method of claim 14 wherein said preparing of the algorithm including:
measuring a hydraulic length of the pipeline between two monitoring locations,
measuring a velocity of sound in the fluid contained in the pipeline, and
establishing an equation for leak location by adding a product of the velocity of sound in the pipeline and a difference in time between when the first monitoring location and the second monitoring location initially receive a signal corresponding to detection of a leak to the hydraulic length and dividing by two (2).

20. The pipeline monitoring method of claim 19 wherein said analyzing includes:
determining when a leak has been sensed at the first monitoring location,
determining when a leak has been sensed at the second monitoring location,
measuring a difference between these two times,
inputting the difference into the equation, and
outputting a distance from the first monitoring location to the leak.

21. An apparatus for determining the location of a leakage of fluid from a pipeline which comprises:
a plurality of means for monitoring physical characteristics of the fluid in the pipeline, and
a means for collecting, organizing, and communicating data obtained by the monitoring means, and
a means for determining the location of the leakage, and
an output device for communicating information relating to the location of the leakage, and
wherein said plurality of monitoring means measure the pressure of the fluid and the flow rate of the fluid at stations along said pipeline.

22. The leak locating device of claim 21 wherein said output device is a display having means to relay information relating to the leak's location to a human operator.

23. The leak location device of claim 21 wherein said means for communicating said data collected is a phone modem system, whereby existing phone lines are utilized to transport said data collected from said stations along said pipeline to a common location where said means for determining the location of the leakage analyzes said data.

24. The leak locating device of claim 23 wherein said means for collecting and organizing said created data is a remote terminal unit which coordinates each pressure reading and each flow rate reading at each station with a corresponding time, thereafter repeating this collection process at a new time to continuously update a record of pressure and flow rate thus created.

25. The leak locating device of claim 24 wherein said output device includes an automatic control system connected to said pipeline for diverting flow or shutting off various valves on said pipeline.

26. The leak locating device of claim 25 wherein said collecting and organizing means is a digital computer.

27. The leak locating device of claim 25 wherein said collecting and organizing means is an analog computer.

28. The leak locating device of claim 25 wherein said collecting and organizing means is a collection of discrete electronic or pneumatic components.

29. A kit for attachment to an existing fluid pipeline which enables operators of the pipeline to detect locations of leaks occurring in the pipeline, said kit including:
a plurality of monitoring station pipeline interfaces including means to measure various properties of the fluid within the pipeline and means to collect and sequence measurements taken by said measuring means,
a central data processing station containing means to determine a pipeline's leak location from said measurements and means to communicate this information to an operator, and
a communication system including means to transport said measurements from said monitoring stations pipeline interfaces to said central data processing station, and
wherein each of said monitoring stations includes means to measure both a pressure and a flow rate of the fluid within the pipeline, and wherein fluid data thus collected representing the pressure and the flow rate is transformed into an electronic signal;
whereby said fluid data is utilized by said central processing station;
whereby a pipeline's performance is enhanced by utilization of said kit thereon.

30. The leak locating kit of claim 29 wherein said central data processing station includes a computer containing an algorithm which determines the location of a leak within the pipeline from the data received from said monitoring stations.

31. The leak locating kit of claim 30 wherein said communication system includes a transmitter at each of said monitoring station pipeline interfaces and a receiver at said central data processing station, whereby data created at each of said monitoring stations may be transmitted to said central data processing station.

32. A system for conveying various fluids and determining the occurrence and location of a leakage of said fluids thereby enhancing safety, minimizing disruptions in normal operation due to leakages, and facilitating rapid leakage damage mitigation, repair, and cleanup, said system comprising in combination:
a hollow conduit for transporting said fluid, and a plurality of fluid characteristic monitoring means for monitoring the characteristics of the fluid in the conduit, and providing output signals proportional to the characteristics being monitored, and a leak detection algorithm, and a leak location algorithm, said leak location algorithm having means to compare said output signals before detection of a leak with said output signals after detection of a leak, and an algorithm processing means receiving the output from the monitoring means and performing an analysis to determine the existence and location of a leakage, whereby said system safely, reliably, and efficiently transports fluids.

33. The pipeline of claim 32 wherein said plurality of monitoring means are gauges which measure pressure and flow rate of said fluid.

34. The pipeline of claim 33 wherein said monitoring means further includes a digital computer receiving as input pressure and flow rate data of the fluid at various points along said conduit and outputting to an operator the location of the leak.

35. A method for analyzing measurements of physical characteristics of a fluid within a pipeline to determine the existence and location of a leak in the pipeline, comprising the steps of:

monitoring a plurality of physical characteristics of the fluid which change in response to a leak in the pipeline, before a leak exists, at a plurality of separate locations along the pipeline;

establishing baseline values for the physical characteristics, the baseline values corresponding to the absence of a leak;

collecting data representing changes in the monitored physical characteristics that occur as a result of the leak, the data including measured values of the physical characteristics and a sequence corresponding to when each physical characteristic was recorded;

analyzing the data to detect non-baseline values for the data by utilizing statistical filtering which distinguishes between mere pipeline noise and a variation in values resulting from a leak;

recording an amount of time between which two or more of the separate locations first detect non-baseline values for the physical characteristics; and determining an arithmetic value representative of the location of the leak by inputting into an algorithm the amount of time recorded in said recording step, a speed of sound in the fluid and a distance between the separate locations.

36. A method for analyzing measurements of physical characteristics of a fluid within a pipeline to determine the location of a leak in the pipeline, comprising the steps of:

monitoring a pressure of the fluid and a flow rate of the fluid at a plurality of separate locations along the pipeline before a leak exists;

establishing initial values for the pressure of the fluid and the flow rate of the fluid at each location, each of the initial values corresponding to the absence of a leak;

calculating an initial value for fluid horsepower of the fluid at each location from initial values for the pressure of the fluid and the flow rate of the fluid at each location;

detecting a leak;

collecting data representing changes in values of the pressure of the fluid and the flow rate of the fluid that occur as a result of the leak, the data including measured values of the pressure and the flow rate and a sequence corresponding to when each value was recorded;

calculating a post-leak value for fluid horsepower of the fluid at each location from the data;

calculating a change in fluid horsepower of the fluid between the initial values calculated and post-leak values calculated at each location; and determining an arithmetic value of the location of the leak by inputting into an algorithm the changes in fluid horsepower calculated at each location and a distance between the separate locations.

37. A method for analyzing measurements of physical characteristics of a fluid within a pipeline to determine the location of a leak in the pipeline, comprising the steps of:

monitoring a pressure of the fluid and a flow rate of the fluid on a periodic basis beginning before a leak exists, at a single location along the pipeline;

establishing baseline values for the pressure of the fluid and the flow rate of the fluid, the baseline values corresponding to the absence of a leak;

causing an event having an effect on fluid pressure and fluid flow rate similar to an effect of a leak by mimicking disruption of the fluid in the pipeline in a manner affecting fluid pressure and fluid flow rate, the event having a known location along the pipeline;

monitoring a fluid pressure reaction and a fluid flow rate reaction to the event;

calculating a time corresponding to a phase difference between the fluid pressure reaction to the event and the fluid flow rate reaction to the event;

establishing an equation for leak location as a function of time from the time and event location encountered in said causing step and said calculating step;

detecting a leak;

collecting data representing differences in the fluid pressure and fluid flow rate that occur as a result of the leak, the data including measured values of the fluid pressure and fluid flow rate and a sequence corresponding to when each value was recorded;

calculating a time corresponding to a phase difference between a fluid pressure reaction to the leak and a fluid flow rate reaction to the leak; and determining an arithmetic value of the location of the leak by inputting into the equation the time corresponding to a phase difference between the fluid pressure reaction to the leak and the fluid flow rate reaction to the leak.

* * * * *